United States Patent
Grier et al.

(10) Patent No.: US 7,957,860 B2
(45) Date of Patent: *Jun. 7, 2011

(54) METHOD AND SYSTEM FOR OPTIMIZING VEHICLE DIAGNOSTIC TREES USING SIMILAR TEMPLATES

(75) Inventors: Jeff Grier, Royal Oak, MI (US); Sunil Reddy, Corpus Christi, TX (US); Carl Krzystofczyk, Mount Prospect, IL (US); Bradley Lewis, Gilroy, CA (US)

(73) Assignee: Snap-on Incorporated, Kenosha, WI (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/060,759

(22) Filed: Apr. 1, 2008

(65) Prior Publication Data

US 2008/0183351 A1    Jul. 31, 2008

Related U.S. Application Data

(63) Continuation of application No. 11/188,308, filed on Jul. 25, 2005, now Pat. No. 7,373,225.

(51) Int. Cl.
  *G01M 17/00* (2006.01)
  *G06F 7/00* (2006.01)
(52) U.S. Cl. ............... 701/29; 701/30; 701/32; 701/33; 340/438; 340/439
(58) Field of Classification Search ............ 701/29, 701/30, 32, 33, 34–36; 340/425.5, 438, 439
  See application file for complete search history.

(56) References Cited

U.S. PATENT DOCUMENTS

| | | | |
|---|---|---|---|
| 4,418,338 A | 11/1983 | Burt | |
| 4,418,388 A | 11/1983 | Allgor et al. | |
| 4,445,177 A | 4/1984 | Bratt et al. | |
| 4,455,602 A | 6/1984 | Baxter et al. | |
| 4,658,370 A | 4/1987 | Erman et al. | |
| 4,796,206 A | 1/1989 | Boscove et al. | |
| 5,250,935 A | 10/1993 | Jonker et al. | |
| H1273 H | 1/1994 | Novick | |
| 5,337,320 A | 8/1994 | Kung | |
| 5,442,549 A | 8/1995 | Larson | |
| 5,533,093 A | 7/1996 | Horton et al. | |
| 5,633,197 A | 5/1997 | Lur et al. | |
| 5,675,714 A | 10/1997 | Kato | |
| 5,835,871 A | 11/1998 | Smith et al. | |
| 6,141,608 A | 10/2000 | Rother | |
| 7,373,225 B1 | 5/2008 | Grier et al. | |
| 7,373,226 B1 | 5/2008 | Cancilla et al. | |
| 7,551,993 B1 | 6/2009 | Cancilla et al. | |

FOREIGN PATENT DOCUMENTS

EP    0 997 638    4/1999

OTHER PUBLICATIONS

U.S. Appl. No. 12/060,764, filed Apr. 1, 2008.

*Primary Examiner* — Gertrude Arthur Jeanglaud
(74) *Attorney, Agent, or Firm* — McDonnell Boehnen Hulbert & Berghoff LLP

(57) ABSTRACT

A method and system for optimizing vehicle diagnostic trees using similar templates is provided. Diagnostic trees may be modified to include diagnostic code tips or further suggestions or instructions indicating what tool to use or how to use the tool. The diagnostic tree cab be modified or customized by comparing the diagnostic tree to previously modified diagnostic trees corresponding to similar vehicles, and suggestions within the previously modified tree that are referenced within a library can be linked to the diagnostic trees.

23 Claims, 11 Drawing Sheets

Fig. 9

Original Node

Connect the flexible fuel line to the injector rail.
Perform an accuracy test of the *J 44175*.
1. Fill the tester with acetone.
2. Connect a DMM to the tester terminals.
3. Set the DMM to AC Hertz scale and take a reading. Is the reading within 6 Hz of the specification?

Modified Node

Connect the flexible fuel line to the injector rail.
Perform an accuracy test of the *Fuel Composition Tester*.
1. Fill the tester with acetone.
2. Connect a DMM to the tester terminals.
3. Set the DMM to AC Hertz scale and take a reading. Is the reading within 6 Hz of the specification?

---

Original Node

Important: Drain the acetone completely from the tester. Clean the beaker with a clean dry paper towel before taking a fuel sample. Be careful not to allow fingerprints, sweat, water, or any other outside debris contaminate the fuel sample, beaker, tester or fuel gauge as this will cause an error in the test result, leading to a misdiagnosis.
1. Perform a fuel test using the *J 44175*.
2. Install a fuel pressure gage into the service port located on the rear of the injector rail.
3. Start the engine and open the valve on the fuel pressure gage. Allow enough fuel to pass through the gage to flush any previous fuel from inside the hose.
4. Draw fuel from the fuel pressure gage into the beaker supplied with the test kit.
5. Transfer the fuel from the beaker into the fuel tester.
6. Turn ON the fuel tester and note the red and green LED.

Modified Node

Important: Drain the acetone completely from the tester. Clean the beaker with a clean dry paper towel before taking a fuel sample. Be careful not to allow fingerprints, sweat, water, or any other outside debris contaminate the fuel sample, beaker, tester or fuel gauge as this will cause an error in the test result, leading to a misdiagnosis.
1. Perform a fuel test using the *Fuel Composition Tester*.
2. Install a fuel pressure gage into the service port located on the rear of the injector rail.
3. Start the engine and open the valve on the fuel pressure gage. Allow enough fuel to pass through the gage to flush any previous fuel from inside the hose.
4. Draw fuel from the fuel pressure gage into the beaker supplied with the test kit.
5. Transfer the fuel from the beaker into the fuel tester.
6. Turn ON the fuel tester and note the red and green LED.

---

Original Node

The *J 44175* has a malfunction. Send tester to a repair facility. Refer to the user manual for shipping and address information.

Modified Node

The *Fuel Composition Tester* has a malfunction. Send tester to a repair facility. Refer to the user manual for shipping and address information.

METHOD AND SYSTEM FOR OPTIMIZING VEHICLE DIAGNOSTIC TREES USING SIMILAR TEMPLATES

RELATED CASES

The present patent application is a continuation of U.S. patent application Ser. No. 11/188,308; filed on Jul. 25, 2005, the full disclosure of which is incorporated here by reference.

BACKGROUND

1. Field of the Application

This application relates generally to test and diagnostic systems for machines or other operating equipment. More particularly, the application relates to an automated process for optimizing diagnostic trees. While the application is described in the context of a vehicle diagnostic system and method, the principles of the present application are equally applicable for air conditioning testing and servicing systems, wheel systems, as well as for various non-automotive apparatus.

2. Description of the Related Art

Automotive vehicles are becoming highly computerized products. Consequently, a number of different types of diagnostic tools have been used to assist in diagnosis and repair of fault conditions in automotive vehicles. Such diagnostic tools can typically be connected to an on-board computer of a vehicle in order to download and analyze vehicle operational information from the on-board computer. For example, a diagnostic tool may obtain information about a vehicle's engine, transmission, mechanical systems, air conditioning systems, braking system, power system, or any other system.

Automotive mechanics are increasingly relying upon computerized diagnosis of vehicle operational information that can be accessed via a vehicle on-board computer to diagnose and repair vehicle faults. This information is often in the form of diagnostic trees, which are created by Original Equipment Manufacturers (OEMs). Diagnostic tools typically allow a user to enter information, including fault symptoms, into the diagnostic tool to be used instead of or in conjunction with the information downloaded from the vehicle's on-board computer to diagnose and assist in the repair of fault conditions in the vehicle.

A number of different types of diagnostic tools have been used, such as engine analyzers, which are designed to monitor a variety of operating conditions of an internal combustion engine, and scanners for downloading data from vehicle on-board computers. In addition, diagnostic tools may include laboratory-type tools like oscilloscopes, digital volt-Ohm meters (DVOM) and the like.

Any of these diagnostic tools may be used with a computer based diagnostic platform that permits a fault-based drivability diagnosis of a vehicle. The platform may present a user with a menu of problems indicated, e.g., by symptoms or service codes, and the user selects those problems that are pertinent to the vehicle under test. Based upon the selected faults, the system then presents the user with a list of tests to be performed to diagnose the cause or causes of the faults. The tests can be listed in the order in which they would most likely be effective in diagnosing the vehicle faults, based upon manufacturer's information and previous repair and diagnosis experience with this type of vehicle, for example.

Manufacturers create diagnostic trees to illustrate the tests for their vehicles on an annual basis, such as for individual Year/Make/Model combinations. The menu of problems and diagnostic trees can include a standard list of symptoms to be used for all vehicles since vehicles use common technology. For example, all vehicles have mechanical, ignition, fuel, and computer components that function in roughly the same manner. A standard list of symptoms is used because it provides a consistent interface and diagnostic philosophy for all vehicles, and promotes technician and service writer familiarization. Other more specific symptoms can then be assigned to specific vehicles for which particular problems are known to exist.

In developing test procedures, focus group experts may evaluate each individual symptom for each specific vehicle. Based on their experience, they develop a list of causes for each symptom and determine a test procedure the user should perform for each cause. The experts attempt to cover any diagnostic trouble code that could be set by each specific automotive vehicle. As a result, an automotive expert will manually prepare automotive diagnostic code tips within the diagnostic trees, repair procedures, component operations, testing processes and other similar functions for all possible vehicle problems and this information can then be displayed in a diagnostic tool. However, the experts then spend much time preparing many hypothetical repair processes that are never used because many of problems never occur. It is estimated that more than 80% of this information is never used, read, or selected by a technician. This information is still necessary though because technicians need to be prepared for all problems.

In addition, many diagnostic trees are identical or similar in content and structure from year to year. However, each tree for a new model should still be evaluated by a Subject Matter Expert (SME) to determine if the existing knowledge (e.g., diagnostic code tips) for a specific vehicle applies to the new model or a similar vehicle in part or in total. This process can take a significant amount of time and effort, and is repetitive for SMEs, which assist in the evaluation of many other diagnostic systems and data.

Furthermore, the manufacturer's diagnostic trees are written assuming the availability of specific equipment. Technicians that do not have the equipment specified may not be able to follow the diagnostic trees for symptom resolution. Therefore, while reviewing diagnostic tress, SMEs may substitute methods in a tree with alternate methods for obtaining the same information, which can make the diagnostic tree more accessible to a greater number of technicians. The SMEs usually go through each tree and type the changes by hand, which again takes a significant amount of time and effort.

SUMMARY

Within embodiments described below, a method for modifying diagnostic trees is provided. The method includes receiving a first diagnostic tree that includes a first set of procedures for diagnosing causes of faults which can be experienced by a first apparatus under diagnosis and suggestions for performing the first set of procedures on the first apparatus. Each procedure in the first set of procedures may include a corresponding suggestion, and each procedure in the first set of procedures includes an identifier. The method further includes receiving a second diagnostic tree that includes a second set of procedures for diagnosing causes of faults which can be experienced by a second apparatus under diagnosis and each procedure in the second set of procedures includes an identifier. The method also includes identifying matching identifiers within the first set of procedures and the second set of procedures so as to identify similar procedures, and for each similar procedure, identifying a corresponding suggestion for performing the procedure on the first apparatus. The method further includes modifying the second set of procedures within the second diagnostic tree so as to associate suggestions for performing a procedure on the first apparatus to similar procedures within the second set of procedures.

These as well as other features, advantages and alternatives will become apparent to those of ordinary skill in the art by reading the following detailed description, with appropriate reference to the accompanying drawings.

BRIEF DESCRIPTION OF THE DRAWINGS

An example embodiment of the present application is described herein with reference to the drawings, in which:

FIG. 9 is one example of nodes within a diagnostic tree before and after a substitution has occurred.

DETAILED DESCRIPTION

I. Exemplary Diagnostic System Architecture

Figure 1:
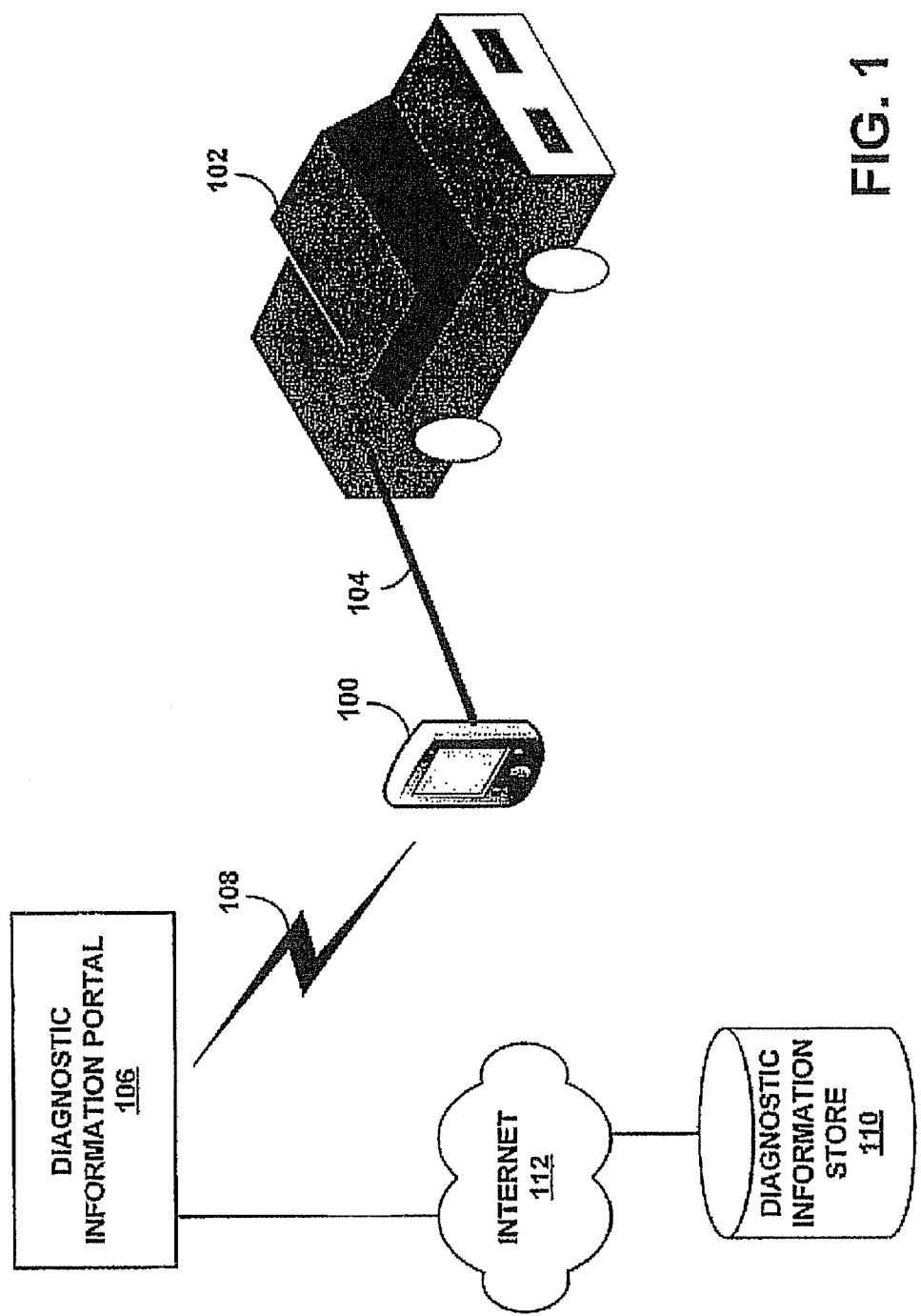
FIG. 1 is a block diagram illustrating a diagnostic system coupled to a vehicle in accordance with one embodiment of the present application.

FIG. 1 is a block diagram of an exemplary system using a diagnostic information portal to provide enhanced vehicle diagnostics. As illustrated, a diagnostic tool 100 interfaces with a vehicle 102 via a wired connection 104. The diagnostic tool 100 may be various types of devices used by a vehicle repair technician. For example, the diagnostic tool 100 may comprise a personal digital assistant (PDA) or other handheld device. Alternatively, the diagnostic tool 100 may comprise a desktop computer, a laptop computer or some other type of diagnostic equipment. Also, while FIG. 1 depicts the diagnostic tool 100 interfacing with the vehicle 102 through the wired connection 104, a wireless connection might alternatively be used.

The diagnostic tool 100 interfaces with the vehicle 102 to collect diagnostic information about the vehicle 102. The information is often in the form of diagnostic trees, which are created by the Original Equipment Manufacturer (OEM) of the vehicle. For example, a number of outside vendors, e.g., Original Equipment Managers (OEM), exist from which car manufacturers buy many of their parts. OEMs provide flowcharts or diagnostic trees indicating instructions to diagnose a fault experienced by automotive vehicles. Thus, the diagnostic trees can be used to diagnose a problem with the vehicle 102. Although FIG. 1 depicts the vehicle 102 as a car, the principles discussed herein are applicable to many types of vehicles. The principles are also applicable to non-vehicles, such as machinery, industrial equipment or other objects that might need to be diagnosed and repaired.

The diagnostic tool 100 may interface with one or more systems within the vehicle 102 to obtain diagnostic information about those systems. For example, the diagnostic tool 100 might obtain information about the vehicle's engine, transmission, electrical systems, air conditioning system, braking system, power steering system or any other systems. The diagnostic tool 100 might interface directly with these various systems, as is illustrated in FIG. 1. Alternatively, the diagnostic tool 100 might interface with other diagnostic equipment (not shown), which in turn interfaces with various systems or components in the vehicle 102. Other configurations are also possible.

Depending on the vehicle 102 and the particular configuration of the diagnostic tool 100 or other equipment, the diagnostic tool 100 may automatically obtain information about the various systems in the vehicle 102. That is, the diagnostic tool 100 might obtain this information automatically upon being connected to the vehicle 102 or upon an appropriate prompt from a user of the diagnostic tool 100. An automated process such as this allows a vehicle repair technician to quickly and efficiently obtain diagnostic information about various systems in the vehicle 102.

The vehicle repair technician might also manually direct the diagnostic tool 100 to perform various tests on the vehicle 102 or to acquire certain other diagnostic information about the vehicle 102. This might be in addition to or in place of the previously described automated diagnostic information collection methods. Thus, the diagnostic tool 100 might automatically collect predetermined data, might collect additional data as directed by the vehicle repair technician, or might perform a combination of these methods to acquire the diagnostic information.

Currently, the vehicle repair technician might manually input to the diagnostic tool 100 information about a problem with the vehicle 102 or a modification to the OEM diagnostic tree. For example, the vehicle repair technician might input a description of the problem, such as by typing a description of the problem into the diagnostic tool 100 or by selecting one or more problems from a drop-down menu or some other preprogrammed selection of possible problems. The vehicle repair technician might also input possible causes of the problem into the diagnostic tool 100 or might eliminate possible causes of the problem, for example, in the instance where the vehicle repair technician has already performed some tests or ruled out some possible causes. The vehicle repair technician might additionally enter other information about the vehicle 102, such as its VIN, its make and model, or other identifying information. Alternatively, a technician may evaluate and modify the branches of an OEM diagnostic tree. This information might be collected automatically by the diagnostic tool 100 when it is connected to the vehicle 102.

Once the diagnostic tool 100 acquires the diagnostic information from the vehicle 102 and additional information if any is entered by the vehicle repair technician, the diagnostic tool 100 may then formulate a request to a diagnostic information portal 106. The diagnostic information portal 106 can provide a centralized location for vehicle repair technicians, through the use of diagnostic tools, to submit diagnostic information and to in return obtain possible causes of problems with their vehicles. The diagnostic information portal 106 can be located at the vehicle repair technician's worksite and be used by multiple vehicle repair technicians at that worksite. Alternatively, the diagnostic information portal 106 can be located at a more central location and might then be accessed by vehicle repair technicians a multiple different worksites. Thus the diagnostic information portal 106 might communicate with multiple diagnostic tools, although FIG. 1 illustrates only a single such device.

The diagnostic tool 100 preferably communicates with the diagnostic information portal 106 over a wireless communication link 108; however, a wired link or a combination of wired and wireless links might alternatively be used. The wireless communication link 108 can use a variety of different wireless protocols, such as the protocols under the Institute of Electrical and Electronics Engineers ("IEEE") 802.11 umbrella, IEEE 802.16, IEEE 802.20, Bluetooth, code division multiple access ("CDMA"), frequency division multiple access ("FDMA"), time division multiple access ("TDMA"), Global System for Mobile Communications/General Packet Radio Service ("GSM/GPRS"), Bluetooth or others.

In formulating the request, the diagnostic tool 100 might include the diagnostic information received from the vehicle 102. Alternatively, the diagnostic tool 100 might only include part of the diagnostic information received from the vehicle 102, such as that information most directly related to the problem or modification. The request might additionally include information about the make, model, year, VIN or other identifying information for the vehicle 102, and the request might also additionally include information entered by the vehicle repair technician.

The diagnostic information portal 106 receives the request from the diagnostic tool 100. In response, the diagnostic information portal 106 uses the diagnostic information in the request to search various information sources to determine possible causes for the problem. The diagnostic information portal 106 might itself store these various information sources, such as OEM diagnostic trees, proprietary third party repair procedures, publicly available documentation (e.g., recall notices) or any other information sources than can be used to diagnose problems with the vehicle 102. Alternatively, one or more of the information sources might be stored remotely from the diagnostic information portal 106 in a diagnostic information store 110, which can be accessed by the diagnostic information portal 106 via one or more data networks 112 (e.g., a intranet, a LAN, a WAN, the Internet, etc. . . . ).

Once the diagnostic information portal 106 accesses the information sources to determine the possible causes of the problem, the diagnostic information portal 106 can then send a list or other description of the possible causes back to the diagnostic tool 100. The diagnostic tool 100 can in turn display the possible causes of the problem to the vehicle repair technician. Before sending the possible causes back to the diagnostic tool 100, the diagnostic information portal 106 might statistically prioritize the possible causes, so as to alert the vehicle repair technician to the more likely causes of the problem. This may aid the vehicle repair technician in more quickly diagnosing and fixing the problem with the vehicle 102.

While FIG. 1 illustrates a single diagnostic information portal 106, a diagnostic system might include more than one diagnostic information portal. Each diagnostic information portal in the system might communicate one or more diagnostic tools. Thus, it should be understood that the configurations described herein are merely exemplary in nature, and many alternative configurations might also be used.

Figure 2:
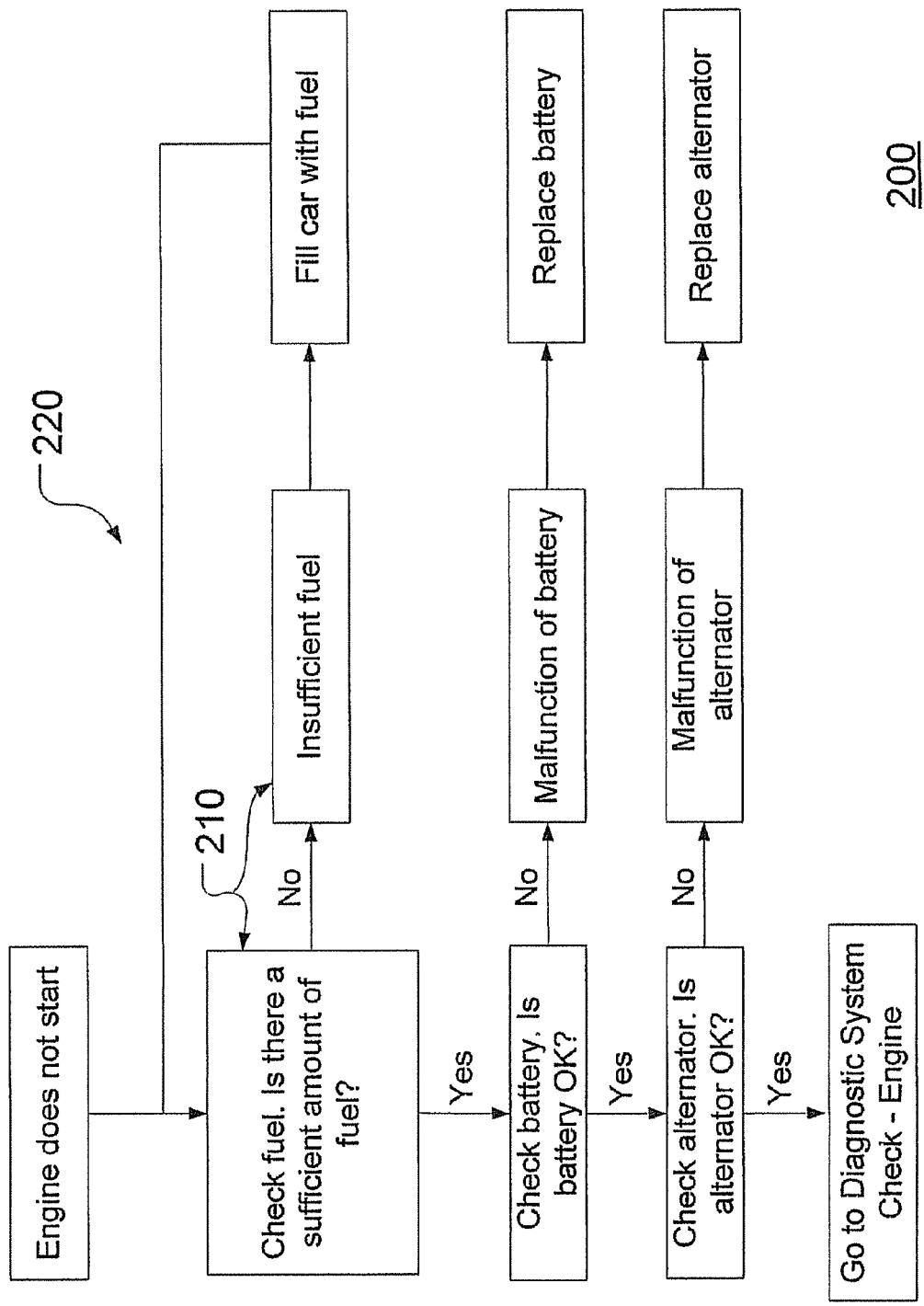
FIG. 2 is an example of a representation of a diagnostic tree in accordance with the present application.

FIG. 2 is a block diagram illustrating one example of an OEM diagnostic tree that may be used in connection with the diagnostic tool 100 and the system in FIG. 1. The diagnostic tree 200 is a flowchart comprising nodes 210 and branches 220. As shown, the nodes 210 include steps which technicians follow to help them determine both the cause and solution to problems with vehicles, for example. The steps shown in FIG. 2 are examples only, since many other tests or procedures may be performed depending on the type of assessment being conducted.

Table 1, provided below, is another example of information included within an OEM diagnostic tree. The nodes include specific steps and/or indicate equipment to be used by technicians for diagnosing vehicle problems, for example.

TABLE 1

| | Test to be performed (Node) | Value | Yes | No |
|---|---|---|---|---|
| 1 | Did you perform the Diagnostic System Check-Engine Controls? | | Go to Step 2 | Go to Diagnostic System Check-Engine |
| 2 | 1. Connect a scan tool. 2. Start the engine and allow the engine to idle. 3. Read the fuel composition frequency on the scan tool. Is the reading steady, above the specification? | 155 Hz | Go to Step 5 | Go to Step 3 |
| 3 | 1. Allow the engine to idle. 2. Agitate the fuel in the fuel tank by pushing the rear of the vehicle from side to side for 5 seconds. 3. Monitor the scan tool fuel composition frequency for 5 minutes. Does the frequency rise above the specification at any time? | 155 Hz | Go to Step 4 | Go to Diagnostic Aids |
| 4 | 1. Turn OFF the engine. 2. Relieve the fuel system pressure. Refer to Fuel Pressure Relief Procedure. 3. Remove the flexible fuel line from the injector fuel rail. 4. Place the flexible fuel line into a suitable container and activate the fuel pump. Collect about 1 liter of fuel and allow the fuel sample to settle. Is any water present in the sample of fuel taken? | | Go to Step 9 | Go to Step 5 |
| 5 | Connect the flexible fuel line to the injector rail. Perform an accuracy test of the J 44175. 1. Fill the tester with acetone. 2. Connect a DMM to the tester terminals. 3. Set the DMM to AC Hertz scale and take a reading. Is the reading within 6 Hz of the specification? | 136 Hz | Go to Step 6 | Go to Step 11 |
| 6 | Important: Drain the acetone completely from the tester. Clean the beaker with a clean dry paper towel before taking a fuel sample. Be careful not to allow fingerprints, sweat, water, or any other outside debris contaminate the fuel sample, beaker, tester or fuel gauge as this will cause an error in the test result, leading to a misdiagnosis. | | Go to Step 8 | Go to Step 7 |

TABLE 1-continued

| Test to be performed (Node) | Value | Yes | No |
|---|---|---|---|
| 1. Perform a fuel test using the J 44175. 2. Install a fuel pressure gage into the service port located on the rear of the injector rail. 3. Start the engine and open the valve on the fuel pressure gage. Allow enough fuel to pass through the gage to flush any previous fuel from inside the hose. 4. Draw fuel from the fuel pressure gage into the beaker supplied with the test kit. 5. Transfer the fuel from the beaker into the fuel tester. 6. Turn ON the fuel tester and note the red and green LED. | | | |
| * Is the green LED ON? | | | |
| 7 Is the red LED ON? | | Go to Step 9 | Go to Step 11 |
| 8 1. Connect a DMM to the fuel tester terminals. 2. Set the DMM to the AC Hz scale and take a reading of the fuel sample. 3. Start the engine and monitor the fuel composition frequency on the scan tool. Is the reading from the scan tool and the DMM within the specified amount? | 12 Hz | Go to Step 9 | Go to Step 10 |
| 9 Connect the flexible fuel line to the injector rail. 1. The fuel is contaminated. 2. Drain the fuel tank. Refer to Fuel Tank Draining Procedure. 3. Replace the fuel with E85 or less. Did you complete the replacement? | | Go to Step 13 | |
| 10 Replace the FCS. Refer to Fuel Composition Sensor Replacement. Did you complete the replacement? | | Go to Step 13 | |
| 11 Replace the 9-volt battery and refill with a fuel sample. Is the RED or GREEN led ON? | | Go to Step 5 | Go to Step 12 |
| 12 The J 44175 has a malfunction. Send tester to a repair facility. Refer to the user manual for shipping and address information. | | | |
| 13 1. Use the scan tool in order to clear the DTCs. 2. Turn OFF the ignition for 30 seconds. 3. Start the engine. 4. Operate the vehicle within the Conditions for Running the DTC as specified in the supporting text. Does the DTC run and pass? | | Go to Step 14 | Go to Step 2 |
| 14 With a scan tool, observe the stored information, Capture Info. Does the scan tool display any DTCs that you have not diagnosed? | | Go to Diagnostic Trouble Code (DTC) List | System OK |

The information in Table 1 is exemplary in nature to illustrate one arrangement of a diagnostic tree. Some of the information in the tree is standard information that is received from the OEM. Additional information may be inserted by an expert after reviewing the tree to provide code tips or suggestions for performing some of the steps. The expert may draw upon his/her experience or observations to provide helpful advice. For example, within step 6 above, the expert may have provided the tip that it is important to drain the acetone completely from the tester, clean the beaker, and not allow fingerprints or outside debris to contaminate the fuel sample, in order to give further guidance to technicians.

II. Exemplary Diagnostic System Operation

The diagnostic tool 100 (or any other computer) may update or edit diagnostic trees (as shown, for example, within step 6 above). Since many diagnostic trees are identical or similar in content and structure from year to year, the diagnostic tool 100 can evaluate and apply edits from one diagnostic tree to a similar diagnostic tree to update and/or modify vehicle information from one year to the next or from one model to a similar model.

As illustrated in FIG. 2, a diagnostic tree has a variety of branches 220 with codes (e.g., tests to perform). From year to year, sometimes new codes are added while old codes may be manually removed or edited by an expert. In an exemplary embodiment, an edited tree is compared to a new unedited tree (possibly from a new model) to determine whether to transfer the edits to the new tree.

Figure 3:
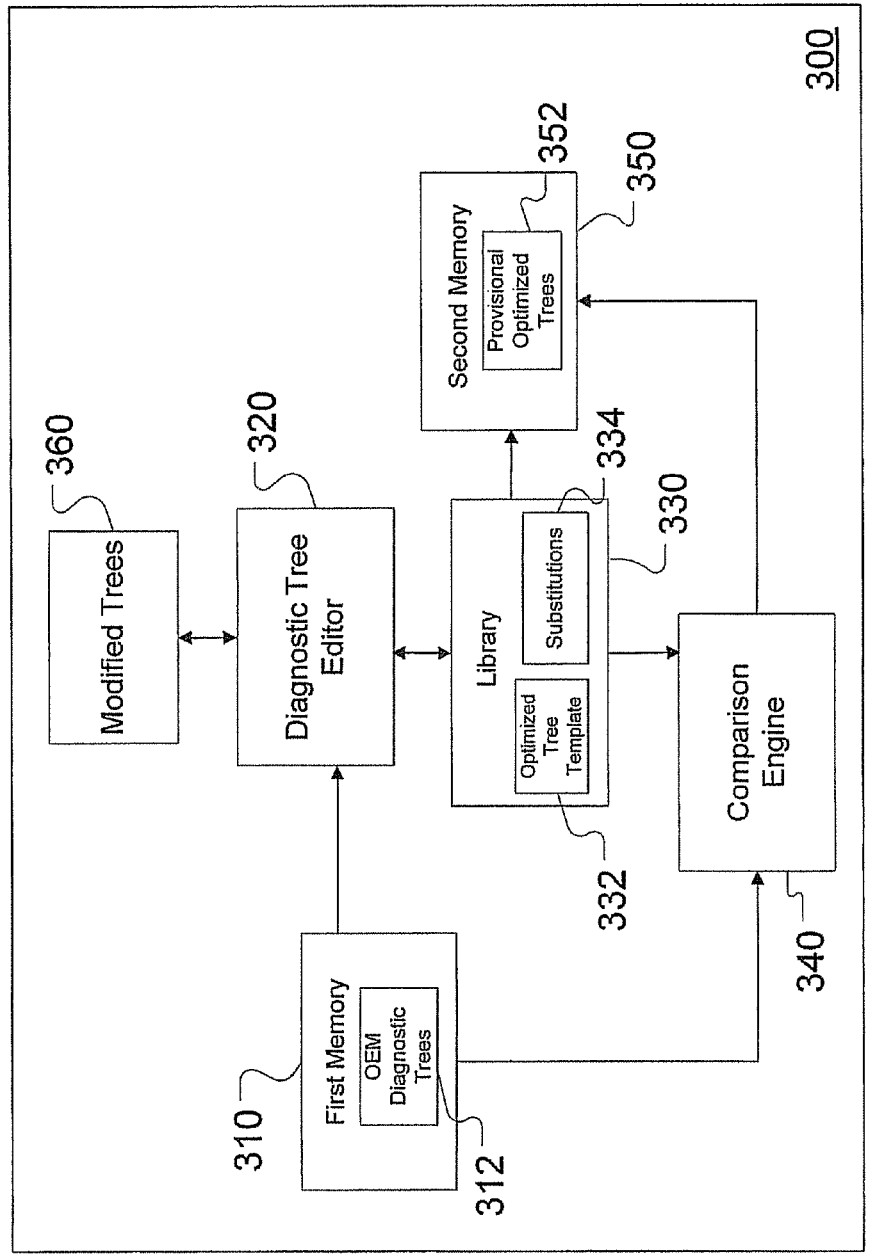
FIG. 3 is a block diagram illustrating a diagnostic tool in accordance with one embodiment of the present application.

Referring to FIG. 3, one example of a system 300 for evaluating diagnostic trees is illustrated. The system 300 evaluates the branches of original diagnostic trees to ensure that updated and/or modified branches of the edited tree are included in the new tree if appropriate.

The system 300 includes a first memory 310 for storing original equipment manufacturer (OEM) diagnostic trees 312, a diagnostic tree editor 320 for evaluating and modifying the OEM diagnostic trees 312, a library 330 for storing optimized tree templates 332 and tree branch substitutions 334, a comparison engine 340 for comparing individual branches of diagnostic trees, and a second memory 350 for storing provisional optimized trees 352. These elements work together to modify an OEM diagnostic tree 312 for use in a repair shop environment by professional mechanics, for example.

In one embodiment, the system 300 modifies OEM diagnostic trees by updating individual branches of a diagnostic tree to comply with changes made in a tree for a previous year. In this embodiment, a subject matter expert (SME) first uses the diagnostic tree editor 320 to evaluate and edit a diagnostic tree. For example, the expert adds comments, suggestions, code or other tips to the branches or tests within the diagnostic tree.

The expert may not edit every single tree. Instead, the expert may select a template diagnostic tree as a representative for a class of vehicles. For example, the Dodge Ram 1500 OEM diagnostic tree is representative of all Dodge Ram truck diagnostic trees as a class, and is considered the model for that class. In this instance, the expert selected a representative genus diagnostic tree (e.g., Dodge Ram 1500 model), such that changes and edits made to this tree can also be applied to all diagnostic trees that are considered a species of this genus (e.g., all Dodge Ram trucks). For example, all Dodge Ram trucks may include certain characteristics present within the Dodge Ram 1500 model.

After editing a representative tree, or editing each tree, the comparison engine 340 compares data in a new diagnostic tree (e.g, a subject) to a model OEM diagnostic tree 312 to determine whether to apply edits from the edited tree to the new tree. The model diagnostic tree is an unedited version of an edited diagnostic tree. The comparison engine 340 compares the new diagnostic tree to the model tree first, to determine whether the new diagnostic tree falls within the same class, or is a similar or matching tree. If so, the comparison engine 340 will incorporate any edits, changes or tips from the edited version of the tree into the new diagnostic tree.

A modified version of the new or subject diagnostic tree is stored as a provisional optimized diagnostic tree 352 in the second memory 350. Then an SME uses the diagnostic tree editor 320 to review the modifications within flagged sections of the provisional optimized diagnostic tree 352. The SME may accept or edit any of the changes made to the tree.

Figure 4:
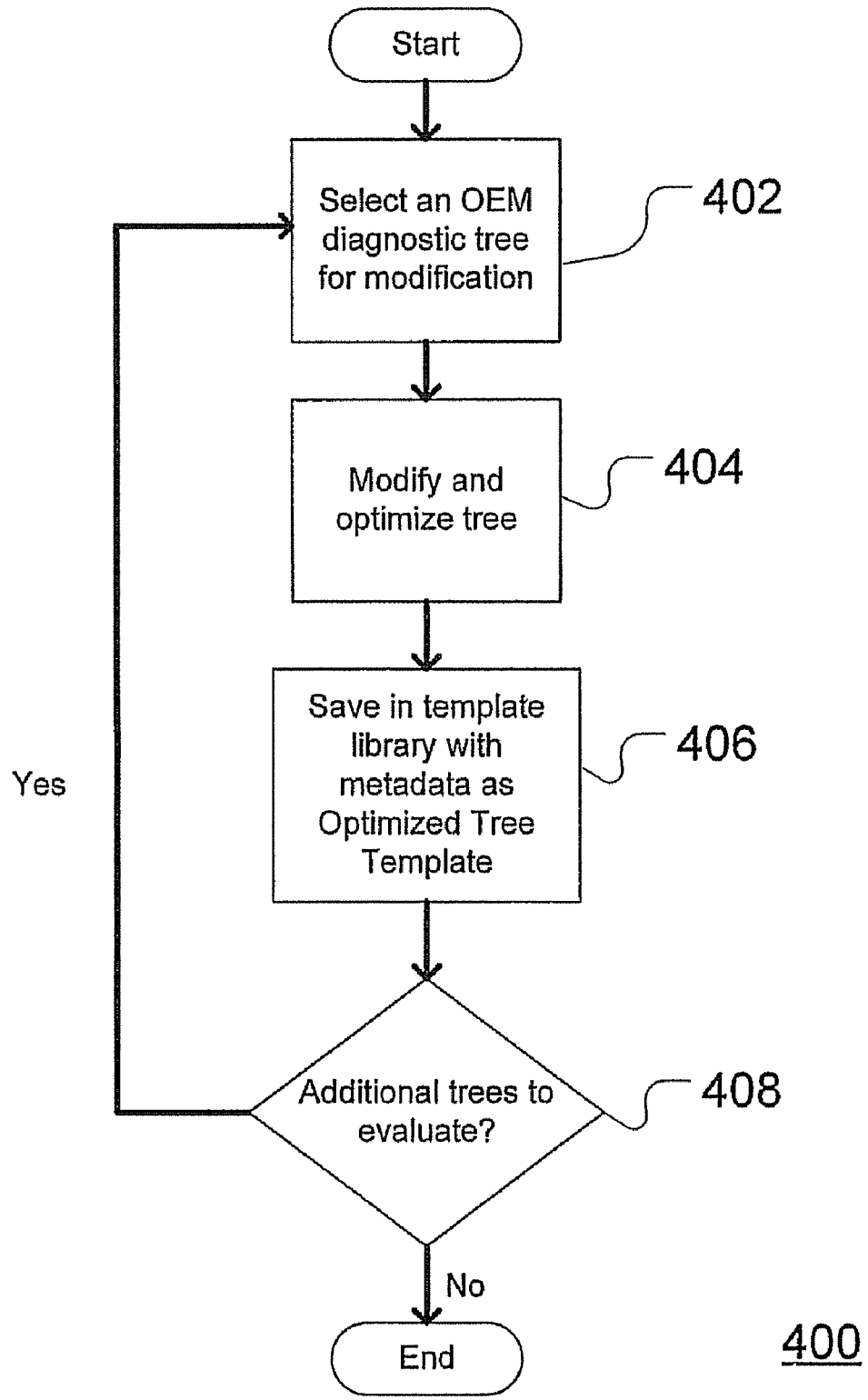
FIG. 4 is a flowchart illustrating one example of a functional process flow for the diagnostic tree editor of FIG. 3.

FIG. 4 is a flowchart 400 illustrating one example of a functional process flow for the diagnostic tree editor 320 of system 300. Initially, an OEM diagnostic tree 312 is selected for modification, as shown at block 402. The tree 312 is selected from a group of unedited trees, possibly from a new shipment of diagnostic trees for new arriving car models, for example. The SME uses her expertise to modify and/or optimize the selected diagnostic tree, as shown at block 404. These modifications may include the addition of comments, suggestions, code, or tips to the branches or nodes within a tree.

The modified tree is then saved in the library 330 along with a set of metadata describing the class of vehicles or genus to which the modified tree may be applied, as shown at block 406. The modified tree may be referred to as a template or an optimized tree template for that class or model, and the SME can refer to this template when modifying trees that are within such a class. The SME continues to analyze diagnostic trees until all trees or all representative trees have been evaluated, as shown at block 408.

Figure 5:
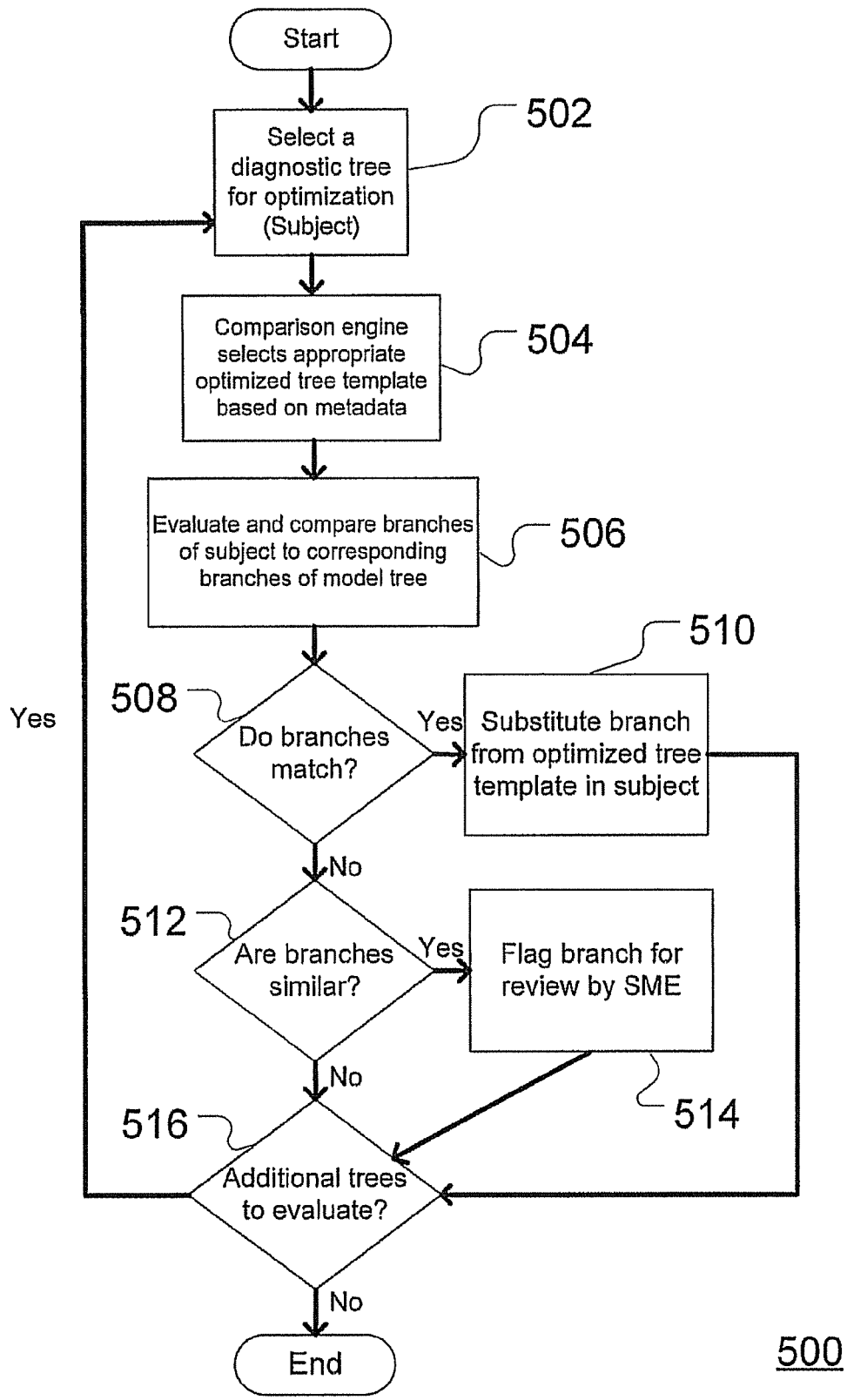
FIG. 5 is a flowchart illustrating one example of a functional process flow for the comparison engine of FIG. 3.

Referring to FIG. 5, a flowchart 500 illustrating one example of a functional process flow for the comparison engine 340 is illustrated. The comparison engine 340 is used to compare the data in a new diagnostic tree (e.g., a subject) to a model OEM diagnostic tree 312. For example, data from an OEM 2005 diagnostic tree for Dodge Ram trucks, a subject, is compared to data from an OEM 2004 diagnostic tree for Dodge Ram trucks, a model.

Initially, the comparison engine 340 selects a subject OEM diagnostic tree 312 for optimization, as shown at block 502. The comparison engine 340 then selects the appropriate optimized tree template 332 from the template library 330 based on metadata of the templates, as shown at block 504. For example, each subject will include identifying data, such as metadata, indicating a class to which the tree belongs, such as within the class of large trucks. Other types of identifiers may also be used. If the subject has metadata matching the model for Dodge Ram trucks, the optimized tree template for Dodge Ram trucks is used. In this manner, the comparison engine 340 can first identify if the subject matches the model (or an unedited version of the tree).

To compare the subject and the model diagnostic trees, the comparison engine 340 evaluates individual branches of the subject by comparing them to a corresponding branch of the model diagnostic tree 312, as shown at block 506. Corresponding branches are branches that have similar content and are located in the same or similar position in a diagnostic tree (e.g., at the beginning or end of a tree). As shown at block 508, if the branches of the subject and the model tree match or are substantially similar, the comparison engine 340 substitutes the corresponding branch from the optimized tree template 332 for the corresponding branch in the subject, as shown at block 510. Alternatively, the comparison engine 340 may compare and substitute nodes within the branches. In this manner, the changes and edits from the optimized tree template can be transferred to the subject tree. As shown at block 512, if the branches are similar but do not match, the difference is noted and the branch is flagged for review by the SME to resolve the discrepancies, as shown at block 514.

For example, referring to Table 1, if a branch in the subject tree (e.g., the combination of "Did you perform the Diagnostic System Check-Engine Controls" and "Go to Diagnostic System Check-Engine") matches the corresponding branch of the model tree, the comparison engine 340 substitutes the corresponding branch from the optimized tree template 332 for the branch in the subject tree. Therefore, the changes and edits from the optimized tree template 332 for a branch are incorporated into the subject tree, and thus the subject tree does not have to be manually evaluated by the SME.

The comparison process continues until all branches of the subject have been evaluated and either optimized or flagged for the attention of the SME, as shown at block 516. When the process is complete, the modified version of the subject is stored as a provisional optimized diagnostic tree 352 along with metadata regarding the original subject and the optimized tree template 332 that was applied. Then the SME is notified that a provisional optimized diagnostic tree 352 is ready for review. The original subject can be retained in its unmodified state for future reference within a local storage device, for example.

Figure 6:
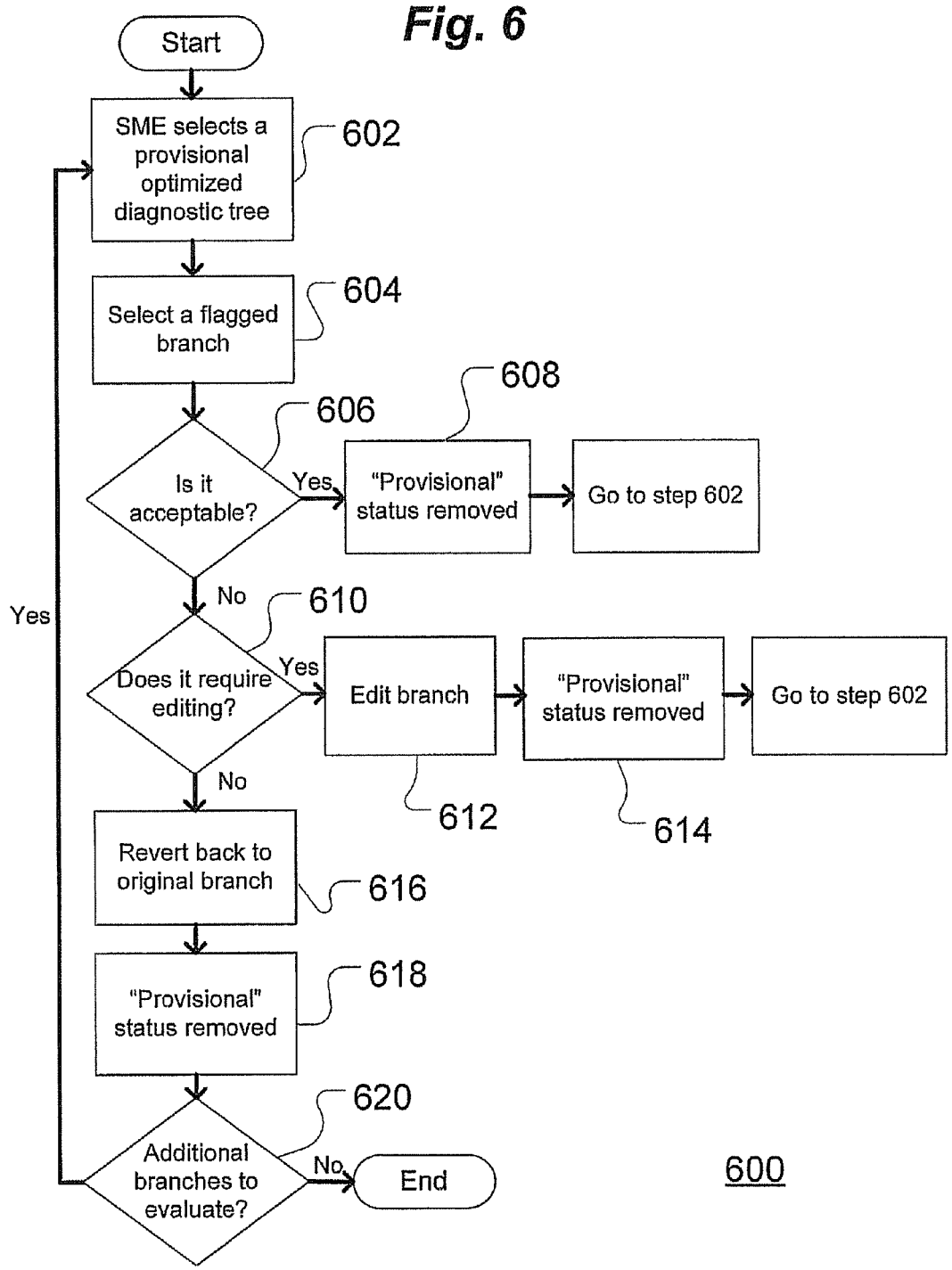
FIG. 6 is a flowchart illustrating another example of a functional process flow for the diagnostic tree editor of FIG. 3.

FIG. 6 is a flowchart 600 illustrating another example of a functional process flow for the diagnostic tree editor 320. During this session, the SME uses the diagnostic tree editor 320 to select a provisional optimized diagnostic tree 352 and related metadata, as shown at block 602. The SME then reviews the modifications, along with the flagged sections of the provisional optimized diagnostic tree 352, and selects a flagged branch to review, as shown at block 604. If the change is acceptable as is, (i.e., if the proposed change will allow the diagnostic tree to function properly), the SME accepts the proposed change from the comparison engine 340, as shown at block 606, the "provisional" status is removed at block 608, and the optimized diagnostic tree is approved for further use in diagnostic devices and products. If the change is not acceptable, but merely requires editing to make it acceptable, as shown at block 610, the SME edits the branch at block 612, the "provisional" status is removed at block 614, and the optimized diagnostic tree is approved for further use in diagnostic devices and products. If the change is unacceptable (i.e., if the proposed change will prevent the diagnostic tree from functioning properly), the SME reverts back to the branch from the original subject as shown at block 616, and the status of "provisional" is removed at block 618.

The method shown in FIG. 6 continues, as shown at block 620, until all of the branches in the provisional optimized diagnostic tree 352 have been evaluated by the SME. By automating this process, the discovery time for an SME to identify the matching and similar sets of data is significantly reduced, such as from about eight hours to about thirty minutes.

Figure 7:
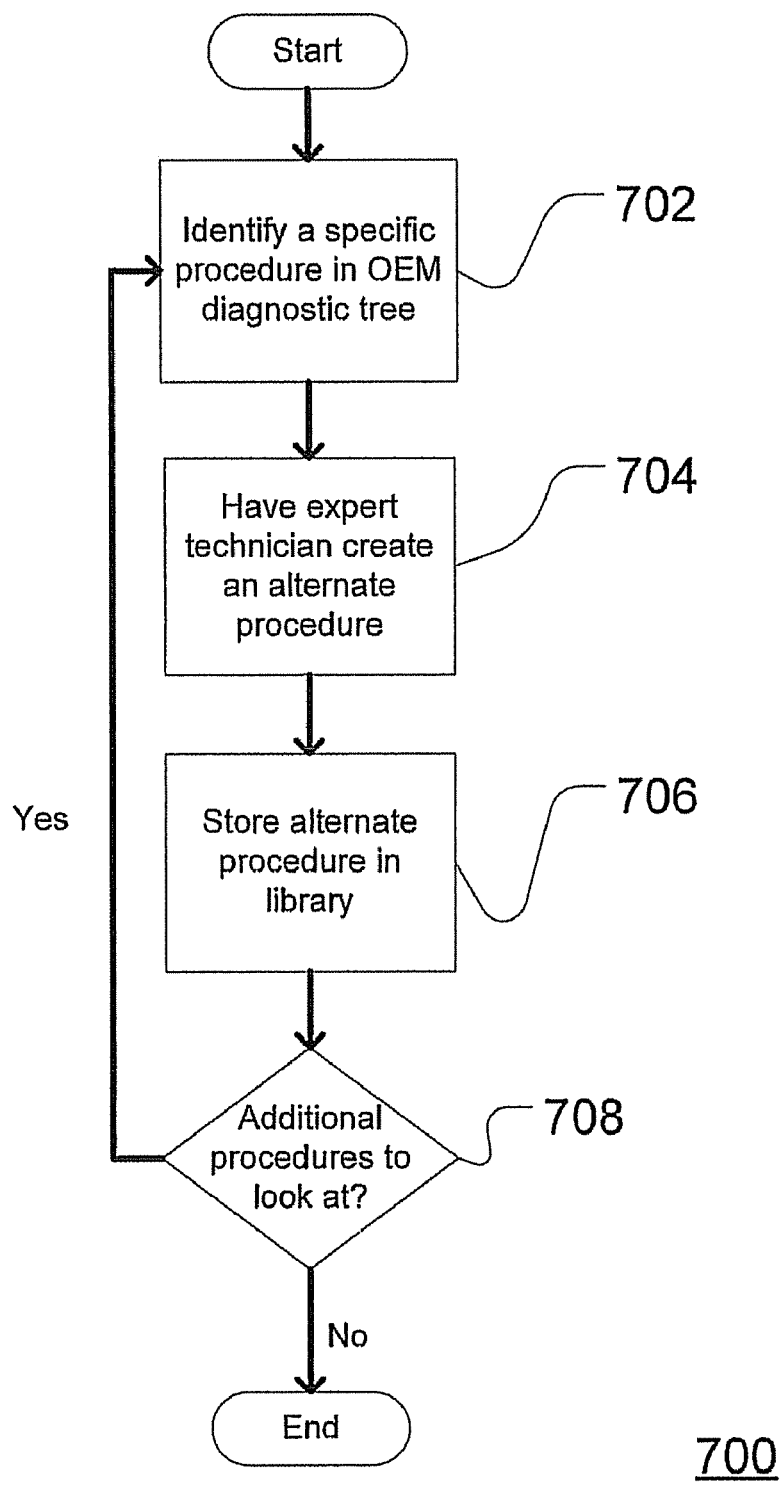
FIG. 7 is a flowchart illustrating another example of a functional process for the diagnostic tree editor of FIG. 3.

In another embodiment of the present application, the system 300 modifies the OEM diagnostic trees by substituting procedures that require the use of a specific tool with alternate, more generic procedures. FIG. 7 is a flowchart illustrating another example of a functional process flow for the diagnostic tree editor 320 of system 300. First, the diagnostic tree editor 320 identifies a specific procedure in an OEM diagnostic tree 312 for modification, as shown at block 702. Next, an SME creates an alternate procedure by analyzing the procedure and identifying an alternative manner of obtaining the same result with a more readily available tool or method, as shown at block 704. For example, a J 39200 is a specific type of voltmeter that may be called for in a diagnostic tree to measure voltage. However, a standard voltmeter could give the same voltage reading as a J 39200. Therefore, a procedure in a diagnostic tree requiring the use of a "J 39200" can be replaced with a "voltmeter". There may be more than one alternate procedure permitted to replace a single procedure, and they may be either generic or specific.

Alternate procedures are then captured and stored, along with the original procedure, in library 330 as substitutions 334, as shown at block 706 (e.g., voltmeter is stored as a reference to "J 39200"). This process continues, as shown at block 708, until the entire diagnostic tree has been evaluated to build a comprehensive library 330 of substitutions 334 for individual procedures in one or more OEM diagnostic trees.

Figure 8:
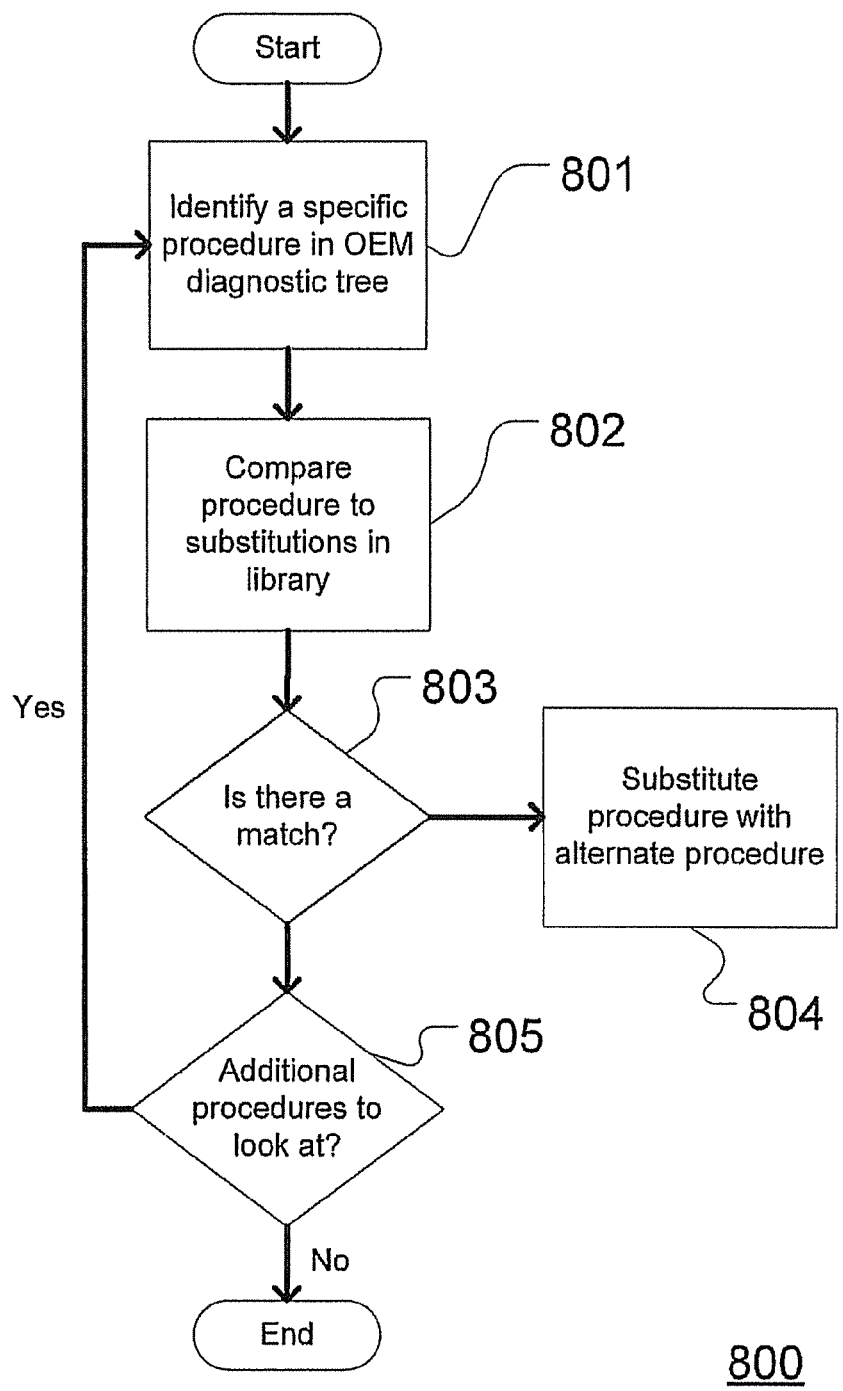
FIG. 8 is a flowchart illustrating another example of a functional process for the diagnostic tree editor of FIG. 3.

Referring to FIG. 8, a flowchart illustrating another example of a functional process flow for the diagnostic tree editor 320 of system 300 is described. Through the use of the library 330, many modified diagnostic trees 360 can be automatically edited. As shown at block 801, a specific procedure is identified in the OEM diagnostic tree 312. At block 802, the procedure is compared to procedures stored in the library (along with the substitutions 334 in the library 330 that the expert has created). For example, if a portion of the procedure includes "J 39200", the tree editor 320 would search the library for a listing including J 39200. Using the example above, J 39200 would be found and that portion of the procedure would be matched to "voltmeter". If no match is found, as shown at block 803, then the procedure remains unchanged. If a match is found, however, then the OEM diagnostic tree is modified by substituting the procedure with the matching substitution 334 stored in the library 330, as shown at block 804. Thus, when a diagnostic tree 312 informs a technician to "use the J 39200 to measure the voltage," the diagnostic tree editor 320 identifies this procedure as replaceable and modifies the procedure to read "use the voltmeter to measure the voltage."

In another example, referring again to Table 1, steps 5, 6, and 12 require the use of a J 44175, which is a specific type of fuel composition tester. In accordance with the present application, an SME would create an alternate procedure for the use of a J 44175, such as the use of a generic fuel composition tester that would yield the same results as the J 44175. Thus, the diagnostic tree editor 320 would substitute "J 44175" with "fuel composition tester" when it appears in a diagnostic tree, for example. An example of nodes corresponding to steps 5, 6, and 12 both before and after the substitution is illustrated in FIG. 9.

This procedure may occur hundreds or thousands of times at various spaces in the diagnostic trees, for example. Accordingly, this process is continued, as shown at block 805, until the entire diagnostic tree 312 is evaluated and modified 360 for simplicity purposes.

In another arrangement, the system 300 may modify a previously modified tree 360. For example, a tree that was previously modified by the diagnostic tree editor 320 to include changes and updates to its branches to comply with the changes made for the current year could then be modified by the diagnostic tree editor 320 to substitute procedures that require use of a specific tool with alternate, more generic procedures. Similarly, a tree that was previously modified by the diagnostic tree editor 320 substituting procedures that require the use of a specific tool with alternate, more generic procedures could then be modified by the diagnostic tree editor 320 to include changes and updates to its branches to comply with the changes made for the current year.

In yet another arrangement, diagnostic trees may be modified to include diagnostic code tips or further suggestions or instructions indicating what tool to use or how to use the tool, for example. Many of the instructions or procedures within a diagnostic tree are performed using specialized tools. An automotive expert (SME) may thus customize the diagnostic trees for specific tools, and for specific problems known to occur on a specific automotive vehicle. Further, an automotive expert can customize the diagnostic trees to indicate procedures to attempt first that are likely to have the greatest probability of solving a specific problem. Since diagnostic trees for automotive vehicles manufactured by the same car manufacturer or of the same model year tend to be similar (e.g., internal mechanisms of automotive vehicles manufactured by the same car company tend to be similar), then some notes and suggestions added by an expert on a diagnostic tree for a previous model can be transferred to a diagnostic tree for a new model.

Thus, a diagnostic tree for a given automotive vehicle can be modified or customized by comparing the diagnostic tree to previously modified diagnostic trees corresponding to similar vehicles, and nodes or work arounds referenced within a library can be linked to the diagnostic tree. For example, a diagnostic tree for a 2004 Buick LeSabre can be modified in much the same way to include comments and suggestions as within a previously customized diagnostic tree for a 2003 Buick LeSabre. The diagnostic tree for the 2004 model may be further modified or may include additional or different instructions than those for the 2003 model. However, many initial or basic customizations for specific faults that are experienced by the Buick LeSabre can be automatically inserted into the diagnostic tree for the 2004 model, for example.

In particular, in one example, electronic software, such as that from Mitchell 1 of Poway, Calif., can receive diagnostic tree information from OEMs, such as automotive repair information, vehicle maintenance information, automotive diagnostic data, labor estimating, shop management software, and service manuals, and can aggregate the information into an electronic format in a common repository. Once the information is aggregated into a diagnostic tree, a computer algorithm can analyze the trees. For example, each diagnostic tree includes multiple text boxes, and each may be considered a node, as discussed above. In this manner, each node of a tree can be compared to nodes of another tree.

Figure 10:
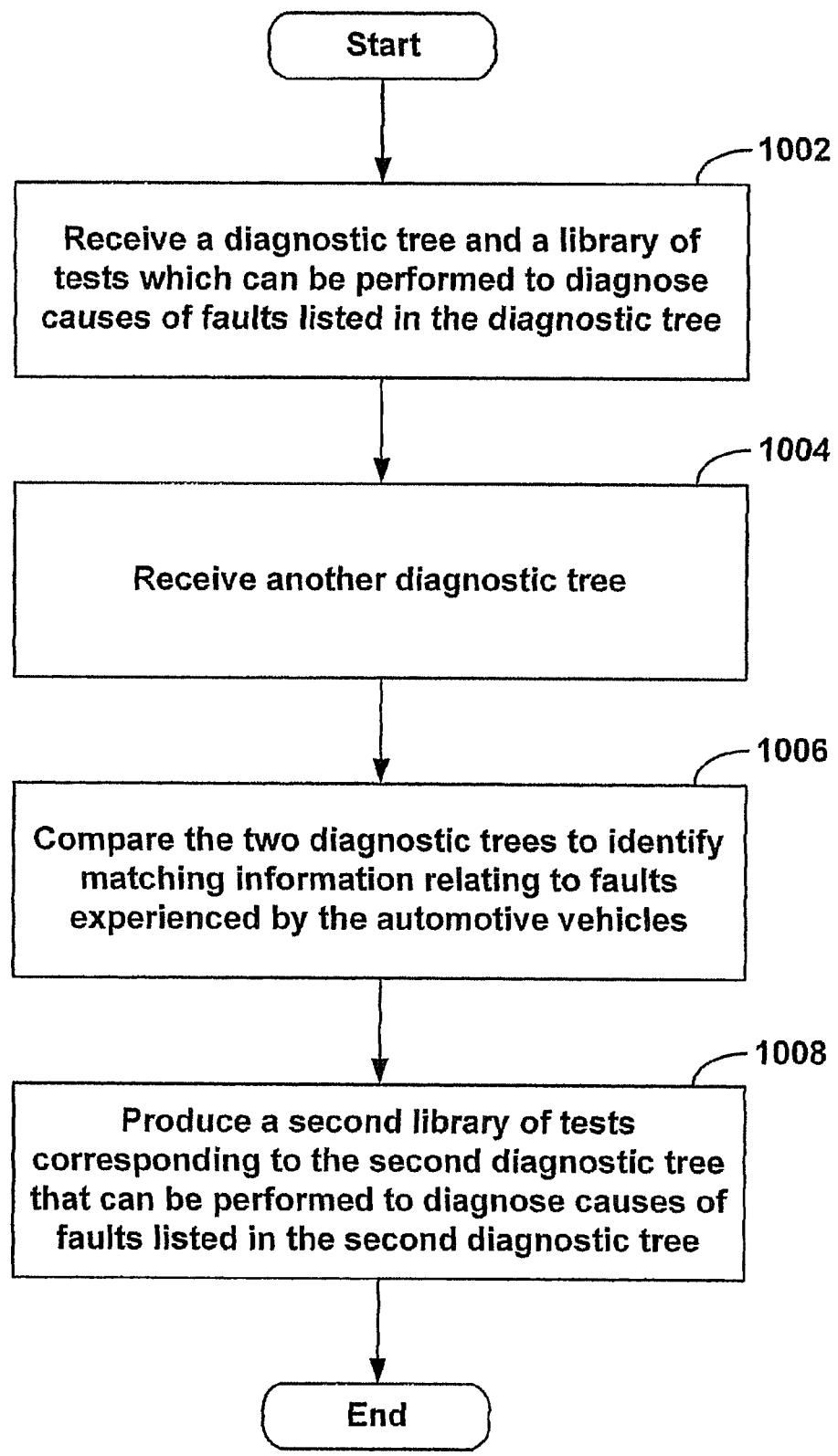
FIG. 10 is a flowchart illustrating one embodiment of a method of transferring data between diagnostic trees.

Once nodes are compared, information relating to one node may be transferred to a node of another tree, if appropriate. FIG. 10 depicts one embodiment of a method of transferring data between diagnostic trees. Initially, a diagnostic tree of information relating to faults that can be experienced by a first apparatus under diagnosis is selected, as shown at block 1002. The tree may have already been modified by an expert to include a library of tests that can be performed on the first apparatus to diagnose causes of these faults. Subsequently, a new diagnostic tree of information relating to faults which can be experienced by a second apparatus under diagnosis is received, as shown at block 1004. The second tree may need to be modified as well. Suppose the second tree corresponds to a diagnostic tree for a new car model. Instead of having the expert manually review the tree and provide specific suggestions, instructions, or tips for performing diagnosis using the tree, the second tree can be compared to a previously modified diagnostic tree that corresponds to a similar car model, for example, to identify matching information relating to faults that can be experienced by the first apparatus and the second apparatus, as shown at block 1006. Then, a second library of tests that can be performed on the second apparatus to diagnose causes of the faults experienced by the second apparatus can be produced, which includes tests corresponding to the matching information, as shown at block 1008, for example. The method described in FIG. 10 may be performed by the system 300 illustrated in FIG. 3, for example.

Figure 11:
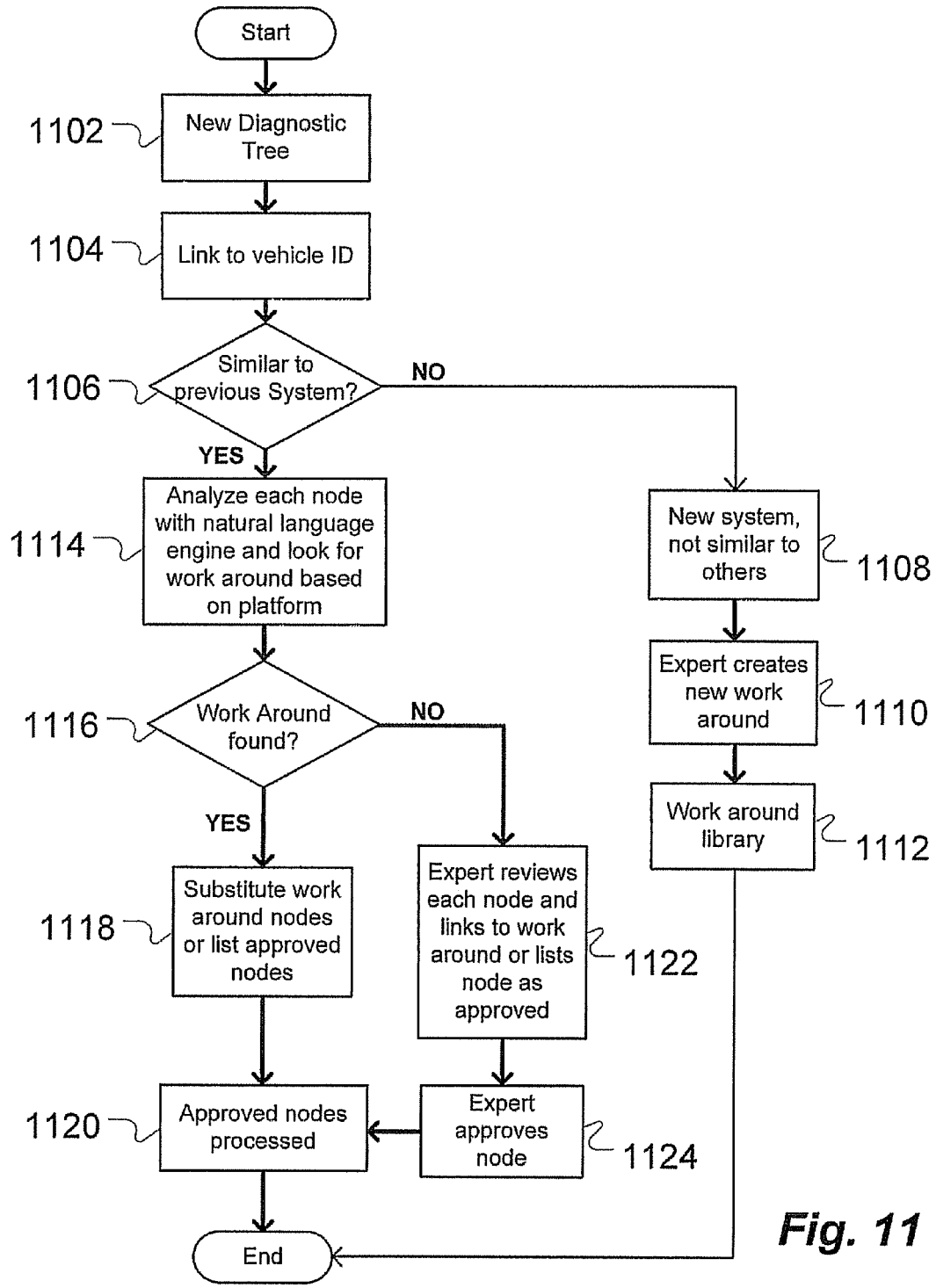
FIG. 11 is a flowchart illustrating another one embodiment of a more detailed method of transferring data between diagnostic trees.

FIG. 11 depicts one example of a more detailed method of transferring data between diagnostic trees. Initially, the system 300 receives a new diagnostic tree including new vehicle code tips, as shown at block 1102. The new tree may simply be a diagnostic tree that has not yet been reviewed by an expert. The new diagnostic tree will be linked to a vehicle identifier, as shown at block 1104, to reference the tree. For example, an expert will briefly review the tree and classify the tree into a group or with a specific vehicle identifier. Next, the system 300 will determine if the vehicle to which the new diagnostic tree has been classified or corresponds, is similar to any previous vehicles for which an expert has already reviewed corresponding diagnostic trees, as shown at block 1106.

To determine whether the tree is similar to previously modified trees, the vehicle ID of the tree is compared to vehicle IDs of previously modified trees. If the vehicle ID matches or substantially matches, then the trees may be considered similar. Or, if the vehicle ID of the new tree falls within a class of vehicles for which a representative tree has been modified, then a similarity may exist. For example, a similarity may exist if the vehicle ID refers to a truck, and in such a case, vehicles in the class of trucks or large vehicles may be considered similar. Alternatively, a similarity may only exist if matching manufacturers along with vehicle models are found. Various criteria may be used to determine whether vehicles sufficiently match so as to compare diagnostic trees. Other examples are possible as well.

If the tree does not correspond to a vehicle that is similar to any previous vehicles, as shown at block 1108, the system 300 flags the new tree for manual review by an expert. An expert will then manually review the tree and provide code tips, suggestions, work arounds, or other helpful information as appropriate within the tree, as shown at block 1110. Example tips or work arounds include adding information to a procedure like suggesting use of a specific tool (e.g., hook up pressure gage and check pressure). Tips or suggestions may originate from OEM manuals or from other validated sources, for example. The tree including the modifications may now be stored in a library, (e.g., library 330), as shown at block 1112, so that other new trees can be compared to this stored tree.

As a specific example, the expert begins reviewing the diagnostic tree at the top of the tree and examines each node of the tree individually and as part of the sequence. In each case, the expert determines if a specific tool (e.g., a Snap-on tool) is capable of performing the listed procedure, for example, and if not the expert substitutes a known work around. Each time a work around is written in the node, the work around or suggestion is given an identifier, and listed in a library of available calls (e.g., library 330). Also, the entire modified node is given an identifier and listed in a library of replacement nodes (e.g., library 330). Thus, as explained below, when a new unknown node appears it could be flagged for the expert to review and then linked with a work around in the library. However, in some cases, a new work around may still need to be created.

If the vehicle ID match is found, as shown at block 1106, then the tree can be compared to the previously reviewed tree. Thus, when a vehicle match is found, then nodes of the new diagnostic tree can be analyzed using a natural language engine to find matches to nodes of the previously modified tree, as shown at block 1114. For example, a first node of the new tree can be compared to possibly the first three nodes of the similar tree, and when substantially the same language is found, then a match may be considered sufficient. A given node of the new tree may be compared to any number of nodes on the similar tree; however, it may only be appropriate to compare nodes to those within a similar position on the trees. For example, nodes within certain groups on the trees can be compared, or nodes at the beginnings and ends can be compared since the nodes will be more likely to match.

For nodes that match, information added by an expert within the modified tree can be transferred or copied to the node on the new diagnostic tree. Thus, the system 300 will then check the matching node for additional information, such as a work around, that is contained or referenced within the library 330, as shown at block 1116. The system 300 will look for approved nodes within the library 330 within the modified diagnostic tree for transfer to the new tree. (Approved nodes may be nodes that an expert has modified). Alternatively, the system 300 may look for known work arounds that are linked to the matching node in order to link the work around also to the new node. For example, any work around nodes or listed approved nodes are found, and they can be substituted into the new diagnostic tree, as shown at block 1118. Either the entire node, or simply text or steps within the node can be substituted for or within the node in the new tree. Subsequently, the substituted nodes or simply the work around or modified information will be processed to be transferred into the new diagnostic tree, as shown at block 1120.

If no additive information is found within the matching node or no work arounds are found or referred to in the library, then the node in the new diagnostic tree may be flagged for expert review, such that an expert can review the node and manually link it to any appropriate known work arounds, as shown at block 1122. Subsequently, the expert will approve the node, as shown at block 1124, and the node modification will be complete. Each node of the new diagnostic tree can be processed in this manner.

Many embodiments have been described as being performed, individually or in combination with other embodiments. However, any of the embodiments described above may be used together or in any combination to produce more efficient diagnostic trees. For example, as explained above, diagnostic trees may be modified by substituting branches or nodes from previously modified tree, by substituting procedures that require the use of a specific tool with alternate, more generic procedures, and/or by including information within nodes such as diagnostic code tips or further suggestions or instructions from previously modified diagnostic trees.

Note that while the present application has been described in the context of a fully functional diagnostic tree system and method, those skilled in the art will appreciate that mechanisms of the present application are capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

While examples have been described in conjunction with present embodiments of the application, persons of skill in the art will appreciate that variations may be made without departure from the scope and spirit of the application. For example, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

What is claimed is:

1. A method of providing enhanced fault diagnostics, said method comprising the steps of:
   providing a diagnostic information portal;
   storing an Original Equipment Manufacturer diagnostic tree at said diagnostic information portal;
   operatively coupling a diagnostic tool and said diagnostic information portal;
   operatively coupling computerized equipment and said diagnostic tool;
   formulating a request by said diagnostic tool;
   directing said request to said diagnostic information portal, said request seeking diagnostic information related to said computerized equipment;
   providing diagnostic information by way of said diagnostic portal in response to said request; and
   collecting fault diagnostic information related to said computerized equipment based on said diagnostic information,
   said diagnostic information being in a form of a diagnostic tree, said diagnostic tree comprising at least one node and at least one branch.

2. The method of claim 1 further comprising the step of formulating said request based on information received from said computerized equipment.

3. The method of claim 1 further comprising the step of formulating said request based on information received from said computerized equipment and a diagnostic information source.

4. The method of claim 1 where said diagnostic tree comprises an Original Equipment Manufacturer (OEM) diagnostic tree.

5. The method of claim 1 further comprising the step of utilizing said diagnostic tree to diagnose a fault experienced by said computerized equipment.

6. The method of claim 1 further comprising the step of automatically collecting diagnostic information from said computerized equipment.

7. The method of claim 1 further comprising the step of collecting fault diagnostic information from said computerized equipment upon a user command.

8. The method of claim 1 further comprising the step of operatively coupling a diagnostic information store to said diagnostic information portal, said diagnostic store providing diagnostic information related to said computerized equipment.

9. The method of claim 8 further comprising the step of utilizing a data network to operative couple said data network to said diagnostic information portal.

10. The method of claim 1 wherein a vehicle utilizes said computerized equipment.

11. The method of claim 1 wherein a machine utilizes said computerized equipment.

12. The method of claim 1 wherein diagnostic equipment utilizes said computerized equipment.

13. A method for analyzing an Original Equipment Manufacturer (OEM) diagnostic tree, said method comprising the steps of:
   providing a first OEM diagnostic tree having a first branch, said first branch comprising code information;
   editing said first OEM diagnostic tree;
   creating a first edited OEM diagnostic tree;
   providing a new diagnostic tree, said new diagnostic tree having a first branch, said first branch of said new diagnostic tree comprising code information; and
   comparing said code information of said first revised OEM diagnostic tree and said code information of said new diagnostic tree;
   substituting said code information of said new diagnostic tree with said code information of said revised OEM diagnostic tree.

14. The method of claim 13 where said diagnostic tree is utilized by a diagnostic tool to diagnose a fault experienced by a computerized system.

15. The method of claim 14 wherein said computerized system resides in a vehicle.

16. The method of claim 14 wherein said computerized system resides in a machine.

17. The method of claim 14 wherein said computerized system resides in diagnostic equipment.

18. A method comprising:
   receiving a first diagnostic tree including a first set of procedures for diagnosing causes of faults which can be experienced by a first apparatus under diagnosis and suggestions for performing said first set of procedures on said first apparatus, wherein each procedure in said first set of procedures may include a corresponding suggestion, and wherein each procedure in said first set of procedures includes an identifier;
   receiving a second diagnostic tree including a second set of procedures for diagnosing causes of faults which can be experienced by a second apparatus under diagnosis, wherein each procedure in said second set of procedures includes an identifier;
   identifying matching identifiers within said first set of procedures and said second set of procedures so as to identify similar procedures; and
   for each similar procedure, identifying a corresponding suggestion for performing said procedure on the first apparatus.

19. The method of claim 18 further comprising the step of modifying said second set of procedures within said second diagnostic tree so as to associate suggestions for performing a procedure on said first apparatus to similar procedures within said second set of procedures.

20. The method of claim 19, wherein modifying said second set of procedures within said second diagnostic tree comprises copying suggestions from said first set of procedures to said second set of procedures.

21. The method of claim 18, wherein identifying matching identifiers within said first set of procedures and said second set of procedures so as to identify similar procedures comprises matching information relating to faults which can be experienced by said first apparatus and said second apparatus.

22. The method of claim 18, wherein said identifier is a vehicle identifier, and wherein identifying matching identifiers within said first set of procedures and said second set of procedures so as to identify similar procedures comprises matching vehicle identifiers.

23. The method of claim 18, wherein said identifier is a vehicle identifier, and wherein identifying matching identifiers within said first set of procedures and said second set of procedures so as to identify similar procedures comprises determining whether identifiers within said second set of procedures belong to said same class of vehicles as do identifiers within said first set of procedures.

* * * * *